A. F. STOWE.
Strap Machine.

No. 5,462. Reissued June 24, 1873.

Witnesses:

A. W. Almquist

Francis McArdle.

Inventor:

Aaron F. Stowe.

PER Munn & Co

Attorneys.

AM. PHOTO-LITHOGRAPHIC CO. N.Y. (OSBORNE'S PROCESS.)

UNITED STATES PATENT OFFICE.

AARON F. STOWE, OF WORCESTER, MASSACHUSETTS.

IMPROVEMENT IN STRAP-MACHINES.

Specification forming part of Letters Patent No. 125,766, dated April 16, 1872; reissue No. 5,462, dated June 24, 1873; application filed May 27, 1873.

*To all whom it may concern:*

Be it known that I, AARON F. STOWE, of Worcester, in the county of Worcester and State of Massachusetts, have invented a new and useful Improvement in Machines for Operating upon Leather; and I do hereby declare the following to be a full, clear, and exact description of the same, reference being had to the accompanying drawing forming part of this specification.

The invention consists in the general application to the two feed-rolls of a smaller roll, arranged in front, and with its axis in a plane passing between and parallel to the planes of the axis of said feed-rolls, to insure evenness and uniformity in the line of cut or in the surface of the leather.

I will now illustrate my invention by describing it in connection with a leather-splitting machine.

Figure 1:
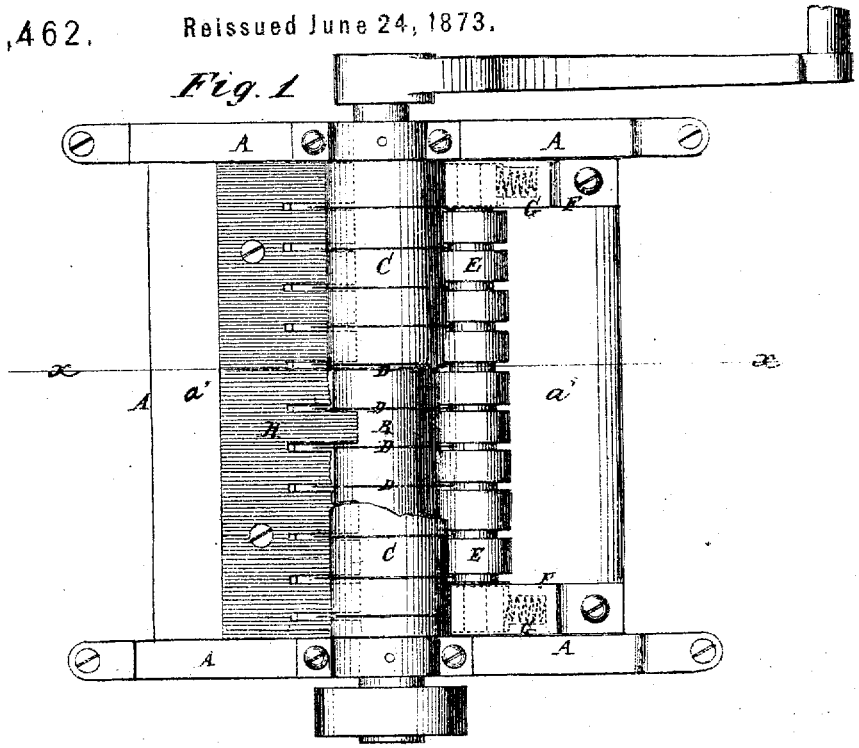
Figure 2:
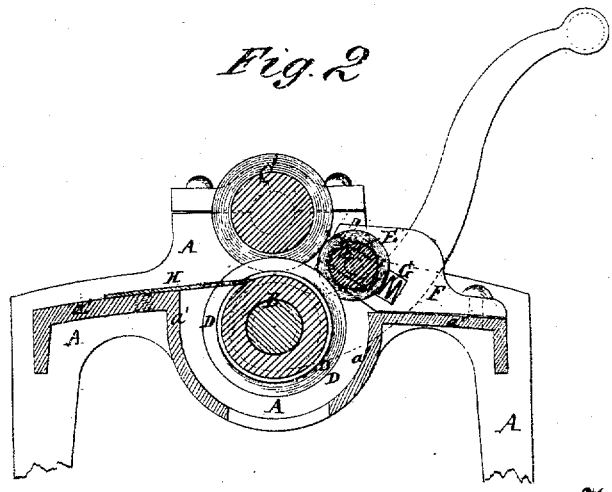

Figure 1 is a top view of my improved machine, part being broken away to show the construction. Fig. 2 is a detail vertical cross-section of the same taken through the line *x x*, Fig. 1.

A represents the frame of the machine, in bearings in the end parts of which revolve the journals of the rollers B C, which are placed the one directly above the other, as shown in Fig. 2. To the lower roller, B, at distances apart equal to the desired breadth of the straps, are attached circular knives D, the edges of which enter grooves in the top roller C. The frame A is made with front and rear tables or aprons *a'*, the inner parts of which are extended downward and inward so as to cover and protect the knives at the front and rear sides of the machine, as shown in Fig. 2. E is a smoothing-roll, the journals of which revolve in bearings placed in slots in the brackets F attached to the frame A. The slots in the brackets F are made inclined, as shown in Fig. 2, and the bearings of the roller E are held forward by the coiled or equivalent springs G. The roller E is placed in the space between the rollers B C, and is made small so that it can enter the said space, the inclination of the slots in the brackets F causing the springs G to press the roller E against the feed-roll C. The roll E is grooved or channeled to receive the edges of the knives D.

By this construction the leather is held between the rollers C and E until, or nearly until, the knives D take hold of it, so that it cannot turn or wrinkle, thus causing the straps to be cut straight. At the same time the springs G allow the roller E to yield to accommodate itself to the varying thickness of the leather. As the straps pass from the machine they are received by the plate H, attached to the table or apron *a'*. The inner edge of the plate H enters the space between the rollers B C, and is slotted for the passage of the edges of the knives D, as shown in Figs. 1 and 2. If desired, part of the knives D may be placed at a distance apart different from the others, so that straps of different widths may be cut by the same machine and at the same time.

This construction is particularly advantageous in shops where different sizes of boots are made, as, for instance, men's, youths', and boys'. The leather being compelled to move around a curve and under pressure, the friction thereon is so considerably increased over what it would be in traveling along a horizontal plane between two ordinary feed-rolls, that it passes with perfect evenness to the knives and condensing-rolls, enabling the work to be done in a much more thorough, uniform, and satisfactory manner.

Having thus described my invention, what I claim as new, and desire to secure by Letters Patent, is—

The combination, with a feed-roll, C, of a small spring-pressed contact-roll, E, having its axis beneath, parallel to, and in front of, feed-roll, as and for the purpose described.

AARON F. STOWE.

Witnesses:

SOLON C. KEMON,

T. D. DURBIN OURAND.